(12) United States Patent
Huang et al.

(10) Patent No.: US 10,582,203 B2
(45) Date of Patent: Mar. 3, 2020

(54) METHOD AND APPARATUS FOR TRANSFORM COEFFICIENT CODING OF NON-SQUARE BLOCKS

(71) Applicant: MediaTek Singapore Pte. Ltd., Singapore (SG)

(72) Inventors: Han Huang, Beijing (CN); Jicheng An, Beijing (CN); Kai Zhang, Beijing (CN)

(73) Assignee: MEDIATEK SINGAPORE PTE. LTD, Singapore (SG)

(*) Notice: Subject to any disclaimer, the term of this patent is extended or adjusted under 35 U.S.C. 154(b) by 0 days.

(21) Appl. No.: 16/171,475

(22) Filed: Oct. 26, 2018

(65) Prior Publication Data

US 2019/0068980 A1    Feb. 28, 2019

Related U.S. Application Data

(62) Division of application No. 15/737,406, filed as application No. PCT/CN2016/086808 on Jun. 23, 2016, now Pat. No. 10,382,768.

(51) Int. Cl.
*H04N 19/18* (2014.01)
*H04N 19/176* (2014.01)
(Continued)

(52) U.S. Cl.
CPC ........... *H04N 19/18* (2014.11); *H04N 19/119* (2014.11); *H04N 19/129* (2014.11); *H04N 19/176* (2014.11); *H04N 19/70* (2014.11)

(58) Field of Classification Search
CPC .... H04N 19/18; H04N 19/119; H04N 19/129; H04N 19/176; H04N 19/70
See application file for complete search history.

(56) References Cited

U.S. PATENT DOCUMENTS

| | | | |
|---|---|---|---|
| 9,621,921 B2 | 4/2017 | Sole Rojals et al. | |
| 9,832,485 B2 | 11/2017 | Sole Rojals et al. | |
| | (Continued) | | |

FOREIGN PATENT DOCUMENTS

| | | |
|---|---|---|
| CN | 103636208 A | 3/2014 |
| CN | 104221288 A | 12/2014 |
| CN | 104247421 A | 12/2014 |

OTHER PUBLICATIONS

Sole, J., et al.; "Removal of the 8x2 and 2x8 coefficient groups;" Joint Collaborative Team on Video Coding (JCT-VC) of ITU-T SG 16 WP 3 and ISO/IEC JTC 1/SC 29/WG 11; Jul. 2012; pp. 1-3.
(Continued)

*Primary Examiner* — Freshteh N Aghdam
(74) *Attorney, Agent, or Firm* — McClure, Qualey & Rodack, LLP

(57) ABSTRACT

A method and apparatus for transform coefficient coding of image and video data for a video encoder or decoder are disclosed. The method determines a CG (coding group) size adaptively based on the current TU. The current TU is divided into one or more current CGs (coding groups) according to the CG size. Bins associated with the coefficients of the current TU are then encoded or decoded according to a selected CG scan path through the current TU and one or more coefficient scan paths within each CG. If TU width is larger or smaller than TU height for the current TU, then CG width is selected to be larger or smaller than CG height accordingly. According to another method, all bypass-coded bins associated with coefficients in the current TU are grouped to improve the parsing throughput rate.

11 Claims, 5 Drawing Sheets

(51) Int. Cl.
*H04N 19/70* (2014.01)
*H04N 19/119* (2014.01)
*H04N 19/129* (2014.01)

(56) References Cited

U.S. PATENT DOCUMENTS

| | | | |
|---|---|---|---|
| 2009/0232204 A1* | 9/2009 | Lee | H04N 19/176 375/240.02 |
| 2012/0163455 A1* | 6/2012 | Zheng | H04N 19/176 375/240.13 |
| 2013/0182757 A1 | 7/2013 | Karczewicz et al. | |
| 2013/0272424 A1 | 10/2013 | Sole Rojals et al. | |
| 2014/0010312 A1* | 1/2014 | Song | H04N 19/60 375/240.18 |
| 2014/0079135 A1 | 3/2014 | Van der Auwera et al. | |
| 2014/0307800 A1 | 10/2014 | Sole Rojals et al. | |
| 2015/0078443 A1* | 3/2015 | Kolesnikov | H03M 7/4075 375/240.03 |
| 2015/0110473 A1* | 4/2015 | Wang | H04N 19/136 386/341 |
| 2015/0249828 A1* | 9/2015 | Rosewarne | H04N 19/119 375/240.02 |
| 2016/0345030 A1* | 11/2016 | Karczewicz | H04N 19/176 |
| 2016/0353113 A1* | 12/2016 | Zhang | H04N 19/13 |
| 2016/0373741 A1* | 12/2016 | Zhao | H04N 19/70 |

OTHER PUBLICATIONS

Wang, J., et al.; "Multiple sign bits hiding for High Efficiency Video Coding;" Nov. 2012; pp. 1-6.
International Search Report dated Sep. 27, 2016, issued in application No. PCT/CN2016/086808.
Sole, J., et al.; "Transform coefficient coding in HEVC;" IEEE Transactions on Circuits and Systems for Video Technology; vol. 22; No. 12; Dec. 2012; pp. 1765-1777.
Sze, V., et al.; "High Efficiency Video Coding (HEVE): Algorithms and Architectures—Chapter 8: Entropy Coding in HEVC;" Jan. 2014; pp. 1-67.
Nguyen, T., et al.; "CE3: Report for CE3 Subtest 3;" Joint Collaborative Team on Video Coding (JCT-VC) of ITU-T SG 16 WP 3 and ISO/IEC JTC 1/SC 29/WG 11; Apr.-May 2012; pp. 1-3.
Sze, V.; "Non-CE11: Simplified Coefficient Scans for NSQT;" Joint Collaborative Team on Video Coding (JCT-VC) of ITU-T SG 16 WP 3 and ISO/IEC JTC 1/SC 29/WG 11; Nov. 2011; pp. 1-8.
Zhang, X., et al.; "Additional sign bit hiding of transform coefficients in HEVC;" Dec. 2012; pp. 1-4.
Sze, V.; "Non-CE11: Simplified Coefficient Scans for Nsqt;" Joint Collaborative Team on Video Coding (JCT-VC) of ITU-T SG16 WP3 and ISO/IEC JTC1/SC29/WG11; Nov. 2011; pps. 1-8.

* cited by examiner

METHOD AND APPARATUS FOR TRANSFORM COEFFICIENT CODING OF NON-SQUARE BLOCKS

CROSS REFERENCE TO RELATED APPLICATIONS

The present invention is a Divisional of pending U.S. patent application Ser. No. 15/737,406, filed on Dec. 18, 2017, which is a National Phase of PCT/CN2016/086808, filed on Jun. 23, 2016, which claims priority to PCT Patent Application, Serial No. PCT/CN2015/082073, filed on Jun. 23, 2015 and PCT Patent Application, Serial No. PCT/CN2015/082833, filed on Jun. 30, 2015. The PCT Patent Applications are hereby incorporated by reference in their entireties.

FIELD OF THE INVENTION

The present invention relates to coding of video and image data using transform coding. In particular, the present invention relates to techniques to improve transform coefficient coding of non-square blocks.

BACKGROUND AND RELATED ARTS

Video data requires a lot of storage space to store or a wide bandwidth to transmit. Along with the growing high resolution and higher frame rates, the storage or transmission bandwidth requirements would be formidable if the video data is stored or transmitted in an uncompressed form. Therefore, video data is often stored or transmitted in a compressed format using video coding techniques. The coding efficiency has been substantially improved using newer video compression formats such as H.264/AVC and the emerging HEVC (High Efficiency Video Coding) standard.

FIG. 1 illustrates an exemplary adaptive Inter/Intra video coding system incorporating loop processing. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data are stored in Reference Picture Buffer 134 and used for prediction of other frames. However, loop filter 130 (e.g. deblocking filter and/or sample adaptive offset, SAO) may be applied to the reconstructed video data before the video data are stored in the reference picture buffer.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Furthermore, the basic unit for transform coding is square size named Transform Unit (TU). A Coding Group (CG) is defined as a set of 16 consecutive coefficients in scan order. For a given scan order, a CG corresponds to a 4×4 subblock. A syntax element coded sub_block_flag is signalled for each to indicate whether the subblock contains non-zero coefficients. If the subblock is significant as indicated by the corresponding flag, then the coefficient significant flag, sign flag, and absolute level of the subblock are further coded by up to five coefficient scan paths. Each coefficient scan path codes a syntax element within a CG, when necessary, as follows:

1) significant_coeff_flag: significance of a coefficient (zero/non-zero)
2) coeff_abs_level_greater1_flag: a flag indicating whether the absolute value of a coefficient level is greater than 1.
3) coeff_abs_level_greater2_flag: a flag indicating whether the absolute value of a coefficient level is greater than 2.
4) coeff_sign_flag: a sign of a significant coefficient (0: positive, 1: negative)
5) coeff_abs_level_remaining: the remaining value for absolute value of a coefficient level (if value is larger than that coded in previous passes).

The bins in the first 3 passes are arithmetically coded in the regular mode (use context) and the bins in scan paths 4 and 5 are arithmetically coded in the bypass mode. Grouping bypass bins can increase the throughput of the entropy coder.

In the current HEVC standard, residuals in a TU is coded in the CG basis and the CGs are coded one by one according to CG scan path, where the CG scan path refers to the scan order for the CGs within a TU. Therefore, while the bypass bins within a CG are grouped together, the regular mode bins and bypass bins in a TU are still interleaved.

For each CG, depending on a criterion, coding the sign of the last non-zero coefficient is omitted when sign data hiding is applied. The sign value is derived by the parity of the sum of the levels of the CG, where an even parity corresponds to the positive sign and an odd parity corresponds to the negative sign. The criterion is the distance in scan order between the first and last non-zero coefficients. If the distance is larger than a threshold (i.e., 4 in HEVC), then sign data hiding is applied.

It is desirable to improve the coding efficiency especially for non-square transform units. Also, it is desirable to improve the throughput rate transform coefficient coding for coding groups.

BRIEF SUMMARY OF THE INVENTION

A method and apparatus for transform coefficient coding of image and video data for a video encoder or decoder are disclosed. The method determines a CG (coding group) size adaptively based on the current TU. The current TU is divided into one or more current CGs (coding groups) according to the CG size. Bins associated with the coefficients of the current TU are then encoded or decoded according to a selected CG scan path through the current TU and one or more coefficient scan paths within each current CG. If TU width is larger or smaller than TU height for the current TU, then CG width is selected to be larger or smaller than CG height for the current CGs accordingly. For example, when the TU size of the current TU corresponds to N×2N or 2N×N, CG size of the current CGs is selected to be 2×4 or 4×2 accordingly. In another example, a smaller CG is used for a smaller TU.

In one embodiment, if the current TU size is smaller than a threshold TU size, the current TU will not be divided into one or more CGs. For example, the threshold TU size can be 8×8.

The CG size can be signalled in a selected syntax level of a bitstream, and the selected syntax level corresponds to a slice header, CTU level (coding tree unit level), CU level (coding unit level), or TU level. A control flag in a higher syntax level of the bitstream can be signalled to control whether to signal the CG size in the selected syntax level. The higher syntax level may correspond to the slice header and the selected syntax level corresponds to the CTU level, CU level, or TU level.

In another embodiment, a flag can be signalled in a selected syntax level of a bitstream to indicate whether adaptive CG is allowed. If the flag indicates the adaptive CG is allowed, a CG size is signalled in each of lower syntax levels lower than the selected syntax level of the bitstream. The selected syntax level of the bitstream corresponds to a coding tree unit (CTU) level and each of lower syntax levels corresponds to a coding unit (CU) level, or the selected syntax level of the bitstream corresponds to the CU level and each of lower syntax levels corresponds to a TU level.

Another method and apparatus for transform coefficient coding of image and video data for a video encoder or decoder are disclosed. According to this method, all bypass-coded bins associated with coefficients in CGs (coding groups) of the current TU without any context-coded coefficient are encoded or decoded using a first individual CG (coding group) scan path through the current TU. All bypass-coded coefficients of the current TU are determined using one or more first coefficient scan paths within each CG. The method may comprise another step of encoding or decoding all context-coded bins associated with coefficients of the current TU without any bypass-coded coefficient using a second individual CG scan path through the current TU. All context-coded bins associated with coefficients of the current TU are determined using one or more second coefficient scan paths within each CG.

In one embodiment of this method, the current TU is divided into one or more first CGs for the first individual CG scan path according to a first CG size and the current TU is divided into one or more second CGs for the second individual CG scan path according to a second CG size, and where the first CG size is different from the second CG size. For example, the second CG size corresponds to 4×4 and the first CG size corresponds to 4×2 or 2×4. In another example, the second CG size corresponds to 4×4, 4×2 or 2×4 and the first CG size corresponds to 4×4.

The bypass-coded bins associated with coefficients of the current TU may comprise syntax elements coeff_sign_flag and coeff_abs_level_remaining. The context-coded bins associated with coefficients of the current TU may comprise syntax elements significant_coeff_flag, coeff_abs_level_greater1_flag, and coeff_abs_level_greater2_flag.

The first CGs for the first individual CG scan path may correspond to N consecutive coefficients of the current TU in a predefined coefficient scan order and N is a positive integer. For example, N may correspond to 4, 6, 8, 10, 12, 16, 24, 32, or 64.

In another embodiment, the current TU is divided into one or more first CGs for the first individual CG scan path according to a first CG size, and sign data hiding is applied to the current TU depending on the first CG size. For example, sign data hiding is applied to the current TU if the first CG size is 24 and distance between a beginning non-zero coefficient and an ending non-zero coefficient is larger than a threshold.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

As mentioned earlier, the coding group (CG) size according to existing HEVC standard is fixed at 4×4 coefficients regardless the transform unit (TU) size. The fixed-size CG may not always result good performance. Accordingly, an adaptive coding group is disclosed in order to improve performance.

Figure 1:
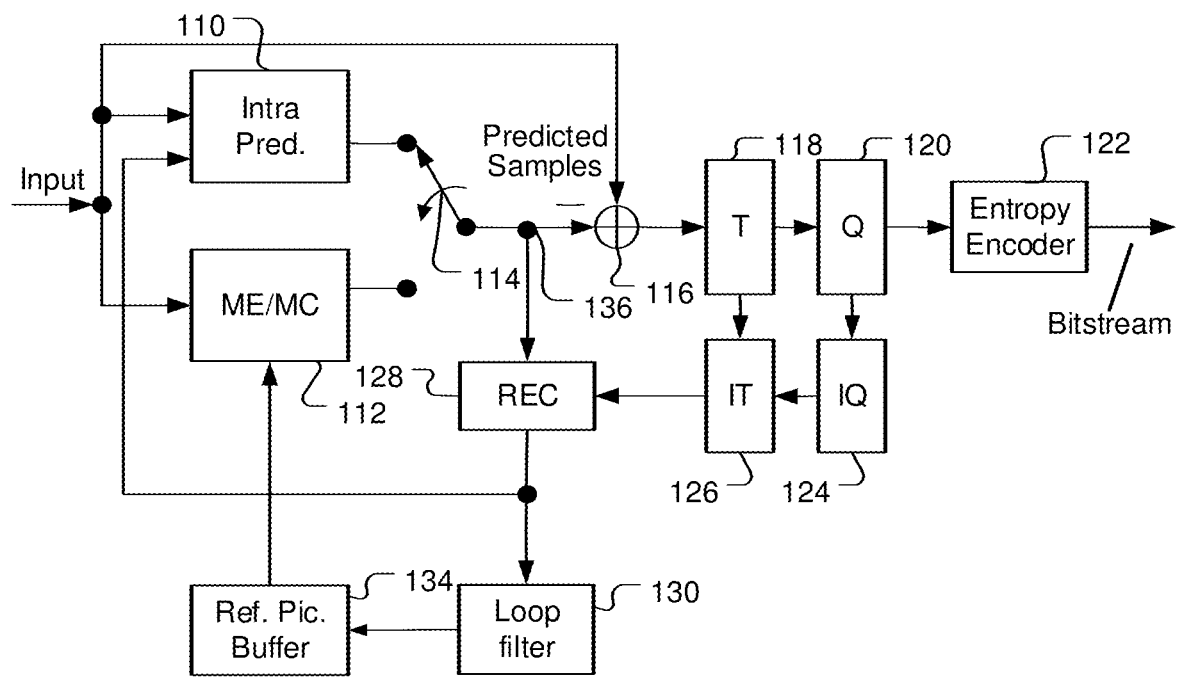
FIG. 1 illustrates an exemplary adaptive Inter/Intra video encoding system using transform, quantization and loop processing.
Figure 2:
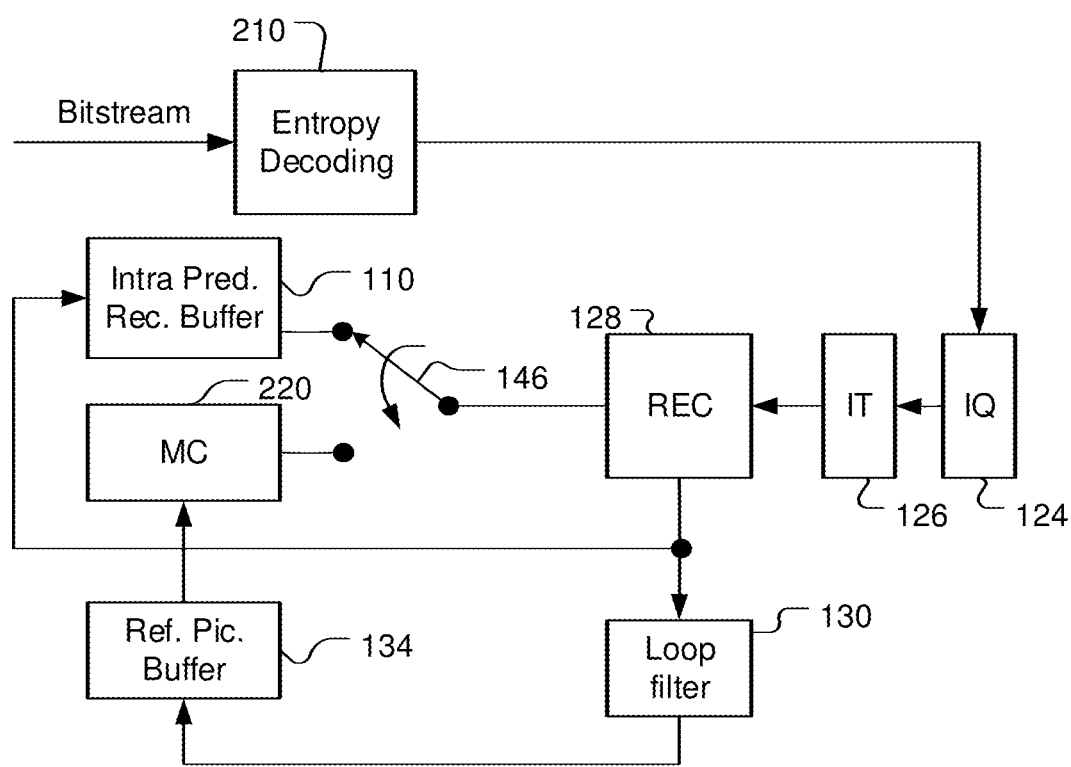
FIG. 2 illustrates an exemplary adaptive Inter/Intra video decoding system using transform, quantization and loop processing.
Figure 3:
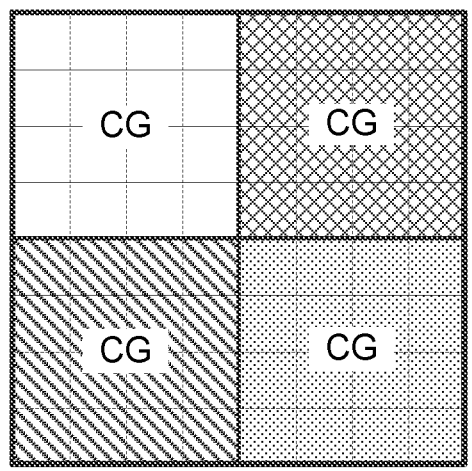
FIG. 3 illustrates an example of coding groups for an 8×8 TU.
Figure 4:
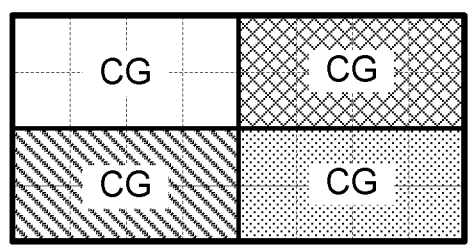
FIG. 4 illustrates an example of coding groups for an 8×4 TU.
Figure 5:
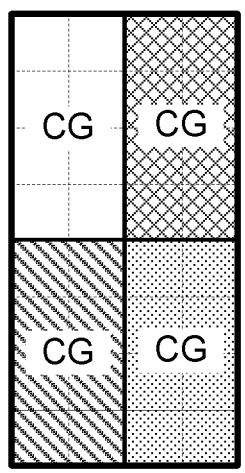
FIG. 5 illustrates an example of coding groups for a 4×8 TU.

In one embodiment, the size of CG is dependent on the TU size. In particular, a non-square CG size is used for a non-square TU. For example, a 2×4 CG is used if TU height is larger than TU width. Similarly, a 4×2 CG is used if TU width is larger than TU height. FIG. 3 illustrates an example of 8×8 TU, where the conventional 4×4 CG is used. For an 8×4 TU, the 4×2 CG is used as shown in FIG. 4. For a 4×8 TU, the 2×4 CG is used as shown in FIG. 5. It is understood that the specific TU sizes and CG sizes mentioned here are intended to illustrate examples of adaptive coding group according to present invention. These specific TU sizes and CG sizes shall not be construed as limitations to the present invention. Other non-fixed 4×4 CG may also be used. In general, if a TU having TU height larger than TU width, a CG having CG height larger than CG width can be used according to an embodiment of the present invention. Alternatively, if a TU having TU width larger than TU height, a CG having CG width larger than CG height can be used according to an embodiment of the present invention.

In another embodiment, a smaller CG is used for a small TU. For example, a 1×1 CG is used for an 8×8 TU. In this case, the CG significant flag is not signalled. Again, it is understood that the specific TU size and CG size mentioned here are intended to illustrate examples of adaptive coding group according to present invention. The specific TU size and CG size shall not be construed as limitations to the present invention. Other smaller CG sizes (e.g. 2×2) may also be used for an 8×8 TU.

In yet another embodiment, CG partition is disabled for small TUs. For example, CG partition is disabled for any TU that is smaller than 8×8. In this case, CG partition is disabled for 4×8 TU, 4×4 TU, 2×8 TU, 8×4 TU, 8×2 TU, etc. In this example, any TU with a size smaller than 8×8 is encoded or decoded without dividing into CGs.

In still another embodiment, the CG size for the CGs in a larger TU is larger than that of CGs in a smaller TU.

The size of CG can be signalled at a slice header, coding tree unit (CTU) level, coding unit (CU) level, or TU level so that a decoder can parse and or decode the coded TU correctly.

If the size of CG is allowed to be signalled at a selected syntax level in the bitstream, a control flag can be signalled in a higher syntax level than the selected syntax level to control whether to signal the CG size in the selected syntax level. For example, the selected syntax level may correspond to the CTU level. In this case, the higher syntax level may correspond to the slice header or other higher syntax level syntax.

In another example, the selected syntax level corresponds to the CU level or TU level, and the higher syntax level corresponds to the slice header or other high syntax level syntax (e.g., the CTU level).

In another embodiment, a flag indicating whether to use adaptive CG size is signalled at selected syntax level. If the flag has a value equal to True, a syntax element indicating the CG size can be signalled at a lower syntax level below the selected syntax level in the bitstream. For example, the selected syntax level may correspond to the CTU level and in this case, the lower syntax level corresponds to the CU level. In another example, the selected syntax level may correspond to the CU level and in this case, the lower syntax level corresponds to the TU level.

Another aspect of the present invention addresses syntax coding of the CGs from a TU. As mentioned previously, the syntax elements associated with each CG are coded in multiple coefficient scan paths. In a first coefficient scan path, syntax element significant_coeff_flag is coded in the first scan path. If any significant coefficient exists in a CG, up to a total of five scan paths may be required to code all syntax elements. The syntax elements that require five scan paths correspond to significant_coeff_flag, coeff_abs_level_greater1_flag, coeff_abs_level_greater2_flag, coeff_sign_flag and coeff_abs_level_remaining. Furthermore, the first three of these five syntax elements are arithmetically coded using the context mode and the last two syntax elements are arithmetically coded in the bypass mode.

In one embodiment of the present invention, coding of syntax elements coeff_sign_flag and coeff_abs_level_remaining are in an individual CG scan path. Therefore, all the bypass coded syntax elements from a TU are all grouped together according to this embodiment.

In another embodiment, three coefficient scan paths are performed within each CG to code the syntax elements significant_coeff_flag, coeff_abs_level_greater1_flag, and coeff_abs_level_greater2_flag in the first pass of CG scan. Furthermore, in the second pass of CG scan, two coefficient scan paths are performed within each CG to code the syntax coeff_sign_flag and coeff_abs_level_remaining elements. According to this embodiment, all context-coded syntax elements from the CGs of a TU are grouped together and all bypass-coded syntax elements from the CGs of a TU are grouped together. Therefore, there is no need to switch between context-coded mode and bypass-coded mode between CGs. This can help to improve the parsing throughput rate.

In yet another embodiment, the CG size in the second CG scan path can be different from the CG size in the first CG scan path. For example, the CG in the first CG scan path corresponds to a 4×4 block size, and the CG in the second CG pass corresponds to a 4×2 or 2×4 block size. In this way, the sub-block size for significant flag coding and sign data hiding can be optimized separately.

In one embodiment, the CG in the first CG scan path corresponds to a 4×4, 4×2 or 2×4 block size depending on the TU size, but the CG in the second pass corresponds to a fixed block size, such as 4×4.

In another embodiment, the CG in the second CG scan path corresponds to N consecutive coefficients in a predefined scan order (e, g. the scan order used in the first scan path). The N can be 4, 6, 8, 10, 12, 16, 24, 32, or 64.

In still another embodiment, the criterion for sign data hiding depends on the CG size in the second CG scan path. For example, if the CG size in the second CG scan path is 24, then the criterion may be the distance between the first non-zero coefficient (i.e., the beginning non-coefficient) and the last non-zero coefficient (i.e., the ending non-zero coefficient) in a CG being larger than M (e. g. M equal to 6 or 8).

In still another embodiment, the CG sizes in the two passes can be explicitly signalled independently.

Figure 6:
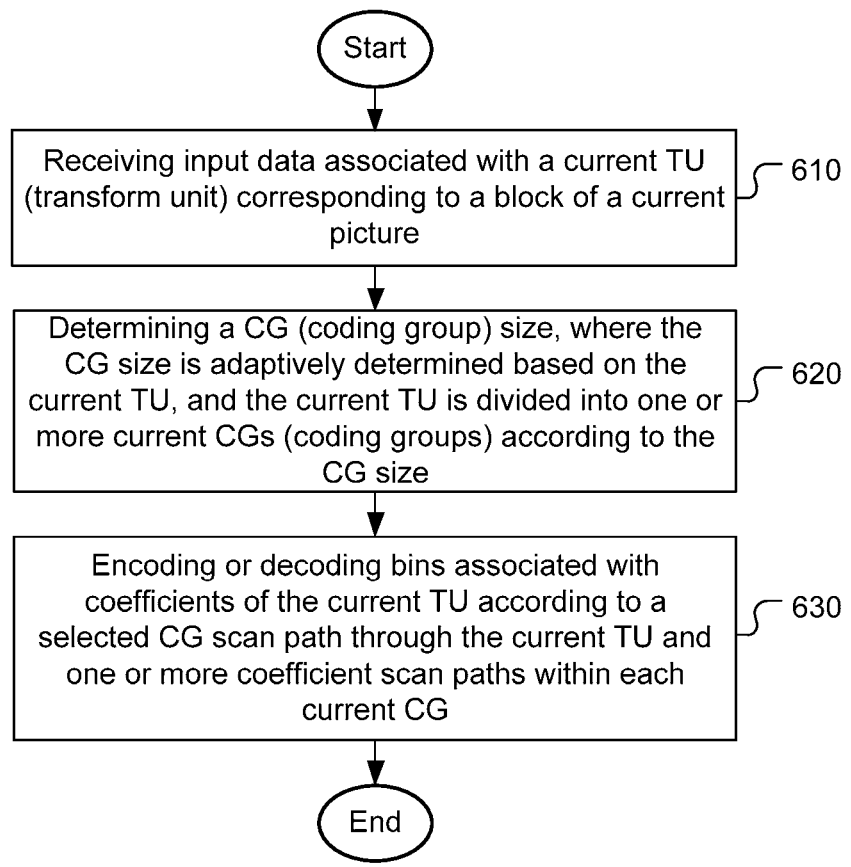
FIG. 6 illustrates an exemplary flowchart for a video coding system utilizing an adaptive coding group according to an embodiment of the present invention.

FIG. 6 illustrates an exemplary flowchart for a video coding system utilizing an adaptive coding group according to an embodiment of the present invention. According to this method, input data associated with a current TU (transform unit) corresponding to a block of a current picture is received as shown in step 610. In the encoder side, the input data correspond to quantized transform coefficients of the current TU to be encoded. In the decoder side, the input data correspond to encoded transform coefficients of the current TU to be decoded. A CG (coding group) size is determined adaptively based on the current TU, and the current TU is divided into one or more current CGs (coding groups) according to the CG size as shown in step 620. Bins associated with the coefficients of the current TU are encoded or decoded according to a selected CG scan path through the current TU and one or more coefficient scan paths within each current CG as shown in step 630. In one embodiment, the selected CG scan path is used to scan a significance flag of each current CG indicating whether the current CG contains any non-zero coefficient, and the coefficient scan paths are used to scan one or more coefficients comprising coefficient significant flags, sign flags, and absolute levels.

Figure 7:
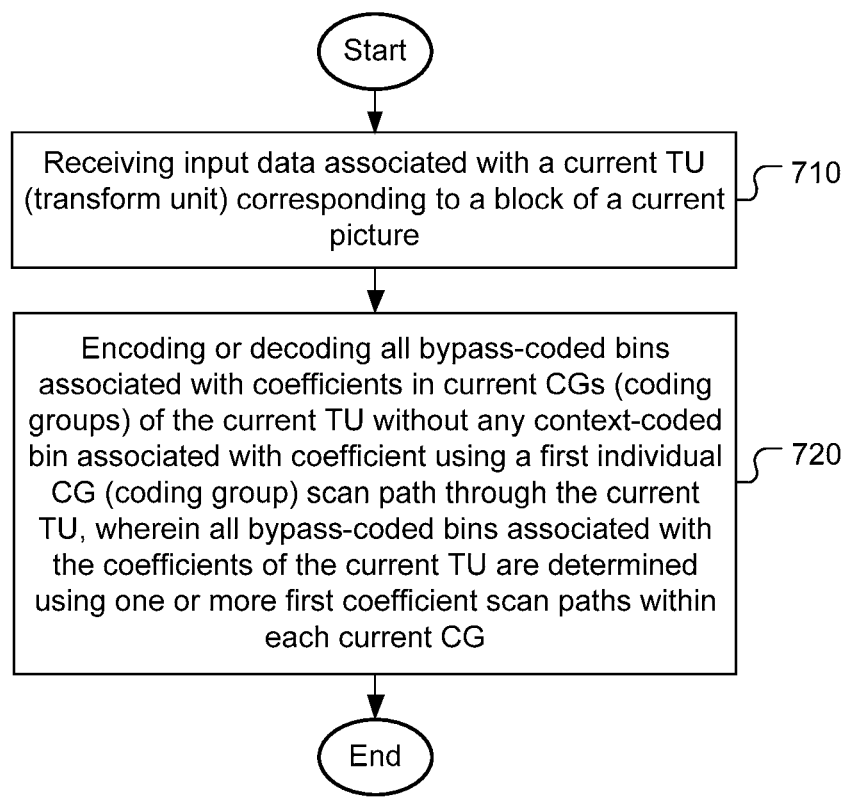
FIG. 7 illustrates an exemplary flowchart for a video coding system utilizing a coding group (CG) with a CG scan path to group all bypass-coded bins associated with coefficients according to an embodiment of the present invention.

FIG. 7 illustrates an exemplary flowchart for a video coding system utilizing a coding group (CG) with a CG scan path to group all bypass-coded bins associated with coefficients according to an embodiment of the present invention. According to this method, input data associated with a current TU (transform unit) corresponding to a block of a current picture is received as shown in step 710. All bypass-coded bins associated with coefficients in CGs (coding groups) of the current TU without any context-coded coefficient are encoded or decoded using a first individual CG (coding group) scan path through the current TU in step 720, where all bypass-coded bins associated with coefficients of the current TU are determined using one or more first coefficient scan paths within each current CG. In one embodiment, the CG size for the current CG is determined based on the size and/or shape of the current TU. For example, non-square CG size is used for non-square TU, such as 2×4 CG is used if TU height is larger than TU width, 4×2 CG is used if TU width is larger than TU height.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for transform coefficient coding of image and video data for a video encoder or decoder, the method comprising:
   receiving input data associated with a current TU (transform unit) corresponding to a block of a current picture; and
   encoding or decoding all bypass-coded bins associated with coefficients in current CGs (coding groups) of the current TU without any context-coded bin associated with coefficient using
   a first individual CG (coding group) scan path through the current TU, wherein all the bypass-coded bins associated with the coefficients of the current TU are determined using one or more first coefficient scan paths within each of the current CGs.

2. The method of claim 1, further comprising a step of encoding or decoding all context-coded bins associated with the coefficients of the current TU without any bypass-coded bin associated with the coefficient using a second individual CG scan path through the current TU, wherein all the context-coded bins associated with the coefficients of the current TU are determined using one or more second coefficient scan paths within each of the current CGs.

3. The method of claim 2, wherein the current TU is divided into one or more first CGs for the first individual CG scan path according to a first CG size and the current TU is divided into one or more second CGs for the second individual CG scan path according to a second CG size, and wherein the first CG size is different from the second CG size.

4. The method of claim 3, wherein the second CG size corresponds to 4×4 and the first CG size corresponds to 4×2 or 2×4.

5. The method of claim 3, wherein the second CG size corresponds to 4×2 or 2×4 and the first CG size corresponds to 4×4.

6. The method of claim 2, wherein the bypass-coded bins associated with the coefficients of the current TU comprise first syntax elements and second syntax elements of the current TU, wherein each of the first syntax elements corresponds to a sign flag of one coefficient and each second syntax element corresponds to a remaining value of one coefficient level.

7. The method of claim 2, wherein the context-coded bins associated with the coefficients of the current TU comprise third syntax elements, fourth syntax element and fifth syntax elements of the current TU, wherein each of the third syntax elements corresponds to a significance flag indicating whether if there is any non-zero coefficient in one CG, the fourth syntax element corresponds to a first level flag indicating whether an absolute value of one coefficient level is greater than one, and the fifth syntax element corresponds to a second level flag indicating whether the absolute value of one coefficient level is greater than two.

8. The method of claim 2, wherein the current TU is divided into one or more first CGs for the first individual CG scan path, and wherein each of the one or more CGs corresponds to N consecutive coefficients of the current TU in a predefined coefficient scan order and N is a positive integer.

9. The method of claim 2, wherein the current TU is divided into one or more first CGs for the first individual CG scan path according to a first CG size, and sign data hiding is applied to the current TU depending on the first CG size.

10. The method of claim 9, wherein said sign data hiding is applied to the current TU if the first CG size is 24 and distance between a beginning non-zero coefficient and an ending non-zero coefficient is larger than a threshold.

11. An apparatus for transform coefficient coding of image and video data performed by a video encoder or decoder, the apparatus comprising one or more electronic circuits or a processor arranged to:

receive input data associated with a current TU (transform unit) corresponding to a block of a current picture; and encode or decode all bypass-coded bins associated with coefficients in CGs (coding groups) of the current TU without any context-coded bin associated with coefficient using a first individual CG (coding group) scan path through the current TU, wherein all the bypass-coded bins associated with the coefficients of the current TU are determined using one or more first coefficient scan paths within each of the CGs.

* * * * *